US005521727A

United States Patent [19]

Inaba et al.

[11] Patent Number: 5,521,727

[45] Date of Patent: May 28, 1996

[54] METHOD AND APPARATUS FOR DRIVING LIQUID CRYSTAL DEVICE WHEREBY A SINGLE PERIOD OF DATA SIGNAL IS DIVIDED INTO PLURAL PULSES OF VARYING PULSE WIDTH AND POLARITY

[75] Inventors: Yutaka Inaba, Kawaguchi; Shinjiro Okada, Isehara; Osamu Taniguchi, Chigasaki; Kazunori Katakura, Atsugi, all of Japan

[73] Assignee: Canon Kabushiki Kaisha, Tokyo, Japan

[21] Appl. No.: 166,945

[22] Filed: Dec. 15, 1993

[30] Foreign Application Priority Data

Dec. 24, 1992 [JP] Japan .................................... 4-357212

[51] Int. Cl.$^6$ .............................. G02F 1/141; G09G 3/36

[52] U.S. Cl. ................................ 359/56; 345/89; 345/94; 345/97

[58] Field of Search ................................ 359/56; 345/97, 345/94, 89

[56] References Cited

U.S. PATENT DOCUMENTS

| | | | |
|---|---|---|---|
| 4,800,382 | 1/1989 | Okada et al. | 340/784 |
| 4,836,656 | 6/1989 | Mouri et al. | 350/350 S |
| 4,932,759 | 6/1990 | Toyono et al. | 350/350 S |
| 5,041,821 | 8/1991 | Onitsuka et al. | 340/784 |

FOREIGN PATENT DOCUMENTS

| | | |
|---|---|---|
| 149899 | 7/1985 | European Pat. Off. . |
| 59-193427 | 11/1984 | Japan . |
| 60-123825 | 7/1985 | Japan . |
| 62-102330 | 5/1987 | Japan . |

*Primary Examiner*—Anita Pellman Gross
*Assistant Examiner*—Fetsum Abraham
*Attorney, Agent, or Firm*—Fitzpatrick, Cella, Harper & Scinto

[57] ABSTRACT

A liquid crystal device is constituted by a pair of oppositely disposed substrates respectively having thereon a group of stripe-shaped scanning electrodes and a group of stripe-shaped data electrodes disposed to intersect the scanning electrodes and a liquid crystal disposed between the scanning electrodes and the data electrodes so as to form a pixel at each intersection of the scanning electrodes and the data electrodes. The liquid crystal device is driven by applying a scanning selection signal sequentially to the scanning electrodes, and applying data signals to the data electrodes while phase modulating the data signals depending on given gradation data. One unit period of data signal is divided into plural sections, the data signals in each section are phase-modulated in one direction in accordance with an increase in gradation data, and the data signals in mutually adjacent sections are phase-modulated in mutually opposite directions in accordance with an increase in gradation data.

12 Claims, 15 Drawing Sheets

FIG. 3(a)
PRIOR ART
0%
FIG. 3(b)
PRIOR ART
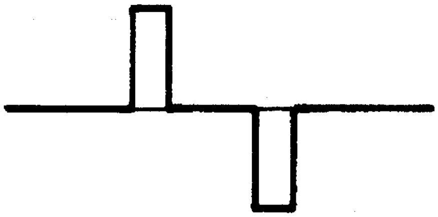
20%
FIG. 3(c)
PRIOR ART
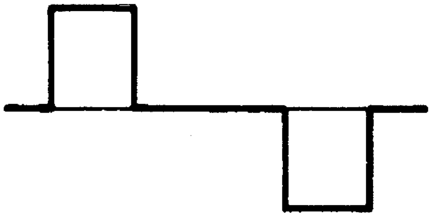
40%
FIG. 3(d)
PRIOR ART
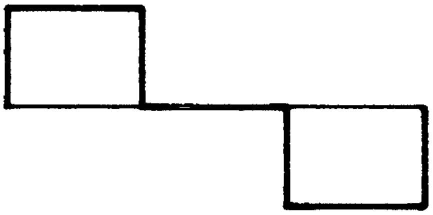
60%
FIG. 3(e)
PRIOR ART
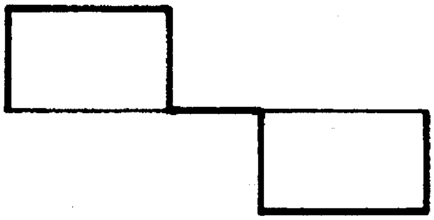
80%
FIG. 3(f)
PRIOR ART
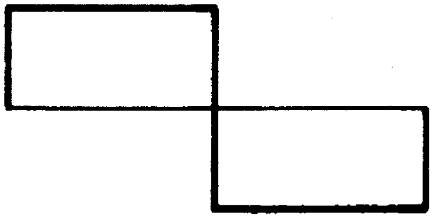
100%

FIG. 8(a) SCAN SELECTION
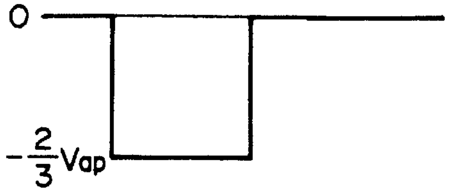
FIG. 8(b) SCAN NON-SELECTION
FIG. 8(c)
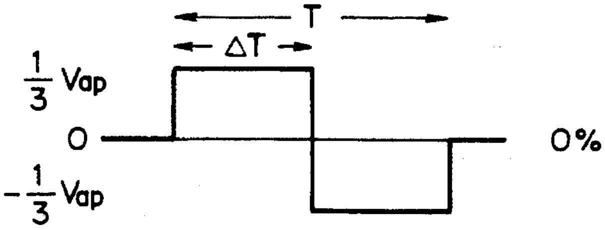
FIG. 8(d)
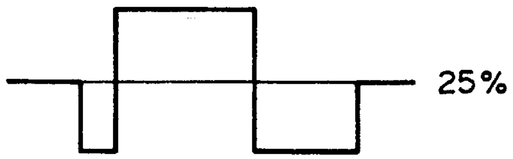
FIG. 8(e)
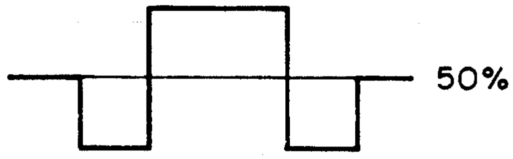
FIG. 8(f)
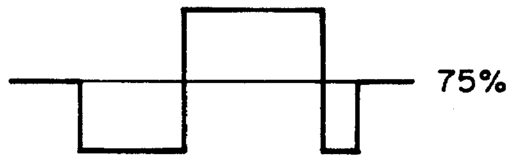
FIG. 8(g)
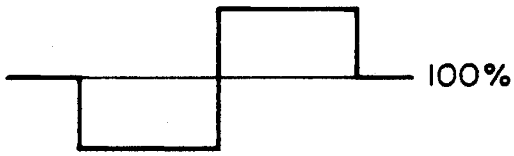

FORMER HALF
LATTER HALF

WRITING PULSE
RESET PULSE

0%
T
t2
t1
t3
(b1)-(a)

25%
(b2)-(a)

50%
(b3)-(a)

75%
(b4)-(a)

100%
(b5)-(a)
tA
tB
POSITIVE
NEGATIVE

T1
T2
T3

S1

S2

S3

S4

(b1)
(b2)
(b3)
I1

(b3)
(b4)
(b5)
I2

T
$t_2$ $t_1$ $t_3$
(b1)-(a)
FIG. 12(b) 0%
(b2)-(a)
FIG. 12(c) 25%
(b3)-(a)
FIG. 12(d) 50%
(b4)-(a)
FIG. 12(e) 75%
(b5)-(a)
FIG. 12(f) 100%
$t_A$ $t_B$ $t_C$
POSITIVE
NEGATIVE
POSITIVE

METHOD AND APPARATUS FOR DRIVING LIQUID CRYSTAL DEVICE WHEREBY A SINGLE PERIOD OF DATA SIGNAL IS DIVIDED INTO PLURAL PULSES OF VARYING PULSE WIDTH AND POLARITY

FIELD OF THE INVENTION AND RELATED ART

The present invention relates to a method and an apparatus for driving a liquid crystal device used in a display apparatus for computer terminals, television receivers, word processors, typewriters and view finders for video camera recorders, and light valves for projectors and liquid crystal printers.

There have been known liquid crystal devices inclusive of those using twisted-nematic (TN) liquid crystals, guest-host (GH)-type liquid crystals and smectic (Sm) liquid crystals.

Among these, a TN-liquid crystal allows a halftone display when driven by an active matrix scheme, but does not show a good responsiveness.

In contrast thereto, a ferroelectric liquid crystal (hereinafter sometimes abbreviated as "FLC") has been regarded as a liquid crystal showing good responsiveness. FLC is generally driven in a binary display mode in a surface-stabilized state but there have been also proposed methods of displaying halftones by forming a bright region and a dark region in one pixel and varying the areal ratio between the bright and dark regions, e.g., according to a matrix drive scheme, as disclosed in (1) Japanese Laid-Open Patent Application (JP-A) 59-193427 and (2) JP-A 62-102230.

FIGS. 1(*a*)–(*f*) show an example set of drive waveforms disclosed in JP-A 59-193427 including a scanning selection signal shown at (a1) and a scanning non-selection signal shown (a2), and various data signals corresponding to given gradation data as shown at (b1)–(b4).

FIG. 2 shows an example set of drive waveforms disclosed in JP-A 62-102330 including a selection signal and a non-selection signal applied to a scanning line shown at 341, a data signal waveforms applied to a data line including signals carrying gradation data shown at 342, combined voltage signals applied to the liquid crystal shown at 351 and an optical response (transmittance) given by application of the combined voltage signals shown at 302. In this case, the data signals used are provided with a symmetry between positive and negative portions so that the time-average of applied voltage during the non-selection period is zero. The data signals at 342 are caused to have a width varying depending on gradation data including one having a width of zero at $t_1$ and $t_6$ representing a transmittance of 0% (dark), data signals at periods $t_2$ and $t_7$, data signals at periods $t_3$ and $t_8$, . . . representing intermediate gradation levels (grey levels), and a data signal at $t_5$ representing a transmittance of 100% (bright). JP-A 62-102330 per se does not further clarify a relationship between the pulse width and the resultant gradation level. If it is assumed that the pulse width is proportional to the resultant gradation level (transmittance), respective gradation levels may be attained by data signals as shown in FIG. 3.

On the other hand, drive waveforms for gradation display are required to satisfy a condition that change (perturbation) in transmittance due to application of non-selection should be made constant regardless of gradation data. This point will be described further.

Now, it is assumed that a matrix display panel as shown in FIG. 4 is driven by a method as illustrated in FIG. 2. FIG. 4 represents a display of a black square image on a generally white background.

A ferroelectric liquid crystal has a property that the liquid crystal molecules in a state formed by application of a positive-polarity pulse exceeding the threshold are moved by application of a negative-polarity pulse below the threshold and the liquid crystal molecules in a state formed by application of a negative-polarity pulse exceeding the threshold are moved by application of a positive polarity pulse below the threshold, respectively, to a position somewhat deviated from the stable positions. When a matrix drive is performed by the driving method of FIG. 2, non-selected pixels (pixels on scanning lines other than a scanning line selected for writing) are supplied with data signals for the pixels on the selected scanning line as non-selection pulses. By the voltages of the non-selection pulses, the liquid crystal does not switch its stable state but causes a perturbation, i.e., changes its molecular axis direction to some extent from its dark display state toward a brighter direction or from its bright display state toward a darker direction.

With respect to pixels 53 and 54 in regions 51 and 52 respectively in FIG. 4, FIGS. 5(*a*) and (*b*) show a scanning signal voltage for pixels 53 and 54 at (a1), a data signal voltage for pixel 53 at (a2), a data signal voltage for pixel 54 at (a3), an optical response at pixel 53 at (b1), and an optical response at pixel 54 at (b2). As these pixels are in the bright state, these pixels cause a response of 100%→0%→100% in response to a clearing pulse and a writing pulse at the time of selection, but also cause some response toward a darker direction by a negative-polarity portion of the non-selection pulses at the time of non-selection.

More specifically, the pixel 53 on a data line on which pixels constituting the black square are present, receives non-selection pulses which are mostly a data signal for 0%, i.e., 0 volt, and partly a data signal for 100%, i.e., alternating pulses of $\pm V_3$. In contrast thereto, the pixel 54 receives non-selection pulses which are always a data signal for 100%. In response thereto, the pixels show different optical responses as shown at (b1) and (b2).

As a result of repetitive scanning or refresh scanning, the optical transmission states of respective pixels are recognized by average light quantities. As is clear from FIGS. 5(*a*) and (*b*), however, the pixels 53 and 54 appear at different brightness levels because of different average transmitted light quantities. FIG. 6 schematically shows an appearance of the resultant picture. Thus, the regions 51 and 52 are both designated to display a 100% transmittance state, whereas the region 51 is recognized as a brighter region adjacent to and extending from the dark square region.

A case of displaying a black square in the white background has been described above, but a similar difficulty is encountered also where a background or a square image is displayed at a halftone level while the difficulty may be somewhat alleviated. More specifically, in the case of a halftone display, pulses having a lower duty cycle than shown in FIGS. 5(*a*) and (*b*) are used but, if there is a difference in gradation level between the background and a square image region, the degree of perturbation in transmittance is different, so that a similar difference in average transmission quantity results.

FIGS. 7(*a*)–(*e*) show a set of drive signal waveforms which have been designed to solve the above-mentioned difficulty. FIG. 7 shows a scanning selection signal at 7(*a*), a scanning non-selection at 7(*b*), and data signals 7(*c*)–(*e*) which are designed to display various gradation levels by voltage signals ranging between 0 and $|\pm V_1|$ (maximum amplitude). As is shown at FIG. 7(*c*), (*d*) and (*e*), the data signals include alternating pulses at phases $T_2$ and $T_3$ as in a conventional method and additionally alternating pulses of complementary amplitudes at phase $T_4$ immediately after the phases $T_2$ and $T_3$.

The perturbation of transmitted light quantity, i.e., the deviation from a stable position, is nearly proportional to a voltage, so that an observable crosstalk quantity, i.e., an accumulated light quantity, is considered to be proportional to the integration of the voltage. Accordingly, the crosstalk quantity may be made constant by setting data signals so that a unit of voltage signals will have a constant voltage-time integrated value regardless of the gradation data. As described above, the liquid crystal in a bright state moves in a darker direction by application of a positive voltage pulse, and the liquid crystal in a dark state moves in a brighter direction by application of a negative voltage, respectively to some extent. Accordingly, it is expected that the perturbations in the bright and dark states become constant, if the negative voltage pulses and the positive voltage pulses are set to have identical integrated values.

In the method shown in FIGS. 7(*a*)–(*e*) developed based on the above consideration, however, one unit of data signals requires a total period of $T_2+T_3+T_4$ which amounts to four times the period ($T_2$) inherently required for determining the gradational level. Thus, the method of FIGS. 7(*a*)–(*e*) has been found to involve a difficulty that the scanning speed becomes slow accordingly.

Different from the above, JP-A 60-123825 has proposed a driving method as illustrated in FIGS. 8(*a*)–(*g*) which show a set of drive signal waveforms including a scanning selection signal at (a1), a scanning non-selection signal at (a2) and data signals corresponding to various gradation levels at (b1)–(b5). This method requires a unit of signals having a period T which is only twice a period ΔT which is inherently required for determining a gradation level. This method is however found to involve a difficulty that a combination of voltage signals for 0% and 100%, if required in succession, results in a continuation of a single polarity pulse for a period of 2Δt, thus causing a larger perturbation and a worse contrast.

SUMMARY OF THE INVENTION

An object of the present invention is to provide a method and an apparatus for driving a liquid crystal device capable of minimizing an adverse effect caused by perturbation of a display state while alleviating the lowering in scanning speed and an adverse effect to contrast.

According to the present invention, there is provided a driving method for a liquid crystal device of the type including a pair of oppositely disposed substrates respectively having thereon a group of stripe-shaped scanning electrodes and a group of stripe-shaped data electrodes disposed to intersect the scanning electrodes and a liquid crystal disposed between the scanning electrodes and the data electrodes so as to form a pixel at each intersection of the scanning electrodes and the data electrodes, said driving method comprising:

applying a scanning selection signal sequentially to the scanning electrodes, and applying data signals to the data electrodes while phase modulating the data signals depending on given gradation data, wherein one unit period of data signal is divided into plural sections, the data signals in each section are phase-modulated in one direction in accordance with an increase in gradation data, and the data signals in mutually adjacent sections are phase-modulated in mutually opposite directions in accordance with an increase in gradation data.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 8(*a*)–(*g*) constitute a waveform diagram showing another known set of drive signals.

DESCRIPTION OF THE PREFERRED EMBODIMENTS

In the following embodiments, a unit period of data signals for providing a desired display state is divided into at least two sections or sub-periods. In each section, the direction of phase modulation is limited to one direction and, in each pair of adjacent sections, the directions of phase modulation are set to be opposite to each other. It is preferred that the data signals provide an effective value of 0 within one unit period.

The liquid crystal used in the present invention may preferably be a smectic liquid crystal inclusive of a ferroelectric liquid crystal in a narrow sense as used in the following embodiments and also a so-called anti-ferroelectric liquid crystal.

(First Embodiment)

Figure 1A:
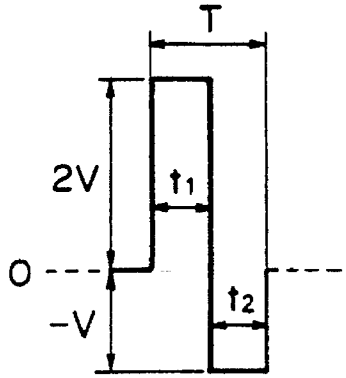
FIG. 1(a) PRIOR ART
FIGS. 1(*a*)–3(*f*) are respectively a waveform diagram showing a set of drive signals used in a prior art method.
Figure 1B:
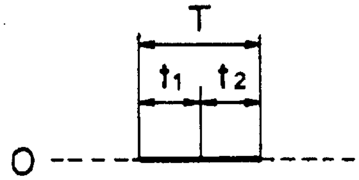
FIG. 1(b) PRIOR ART
Figure 1C:
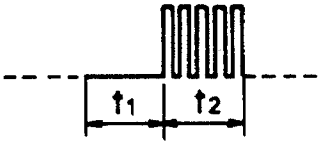
FIG. 1(c) PRIOR ART
Figure 1D:
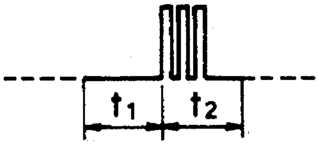
FIG. 1(d) PRIOR ART
Figure 1E:
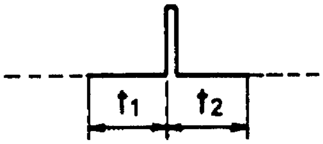
FIG. 1(e) PRIOR ART
Figure 1F:
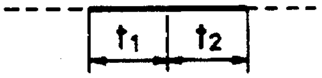
FIG. 1(f) PRIOR ART
Figure 2:
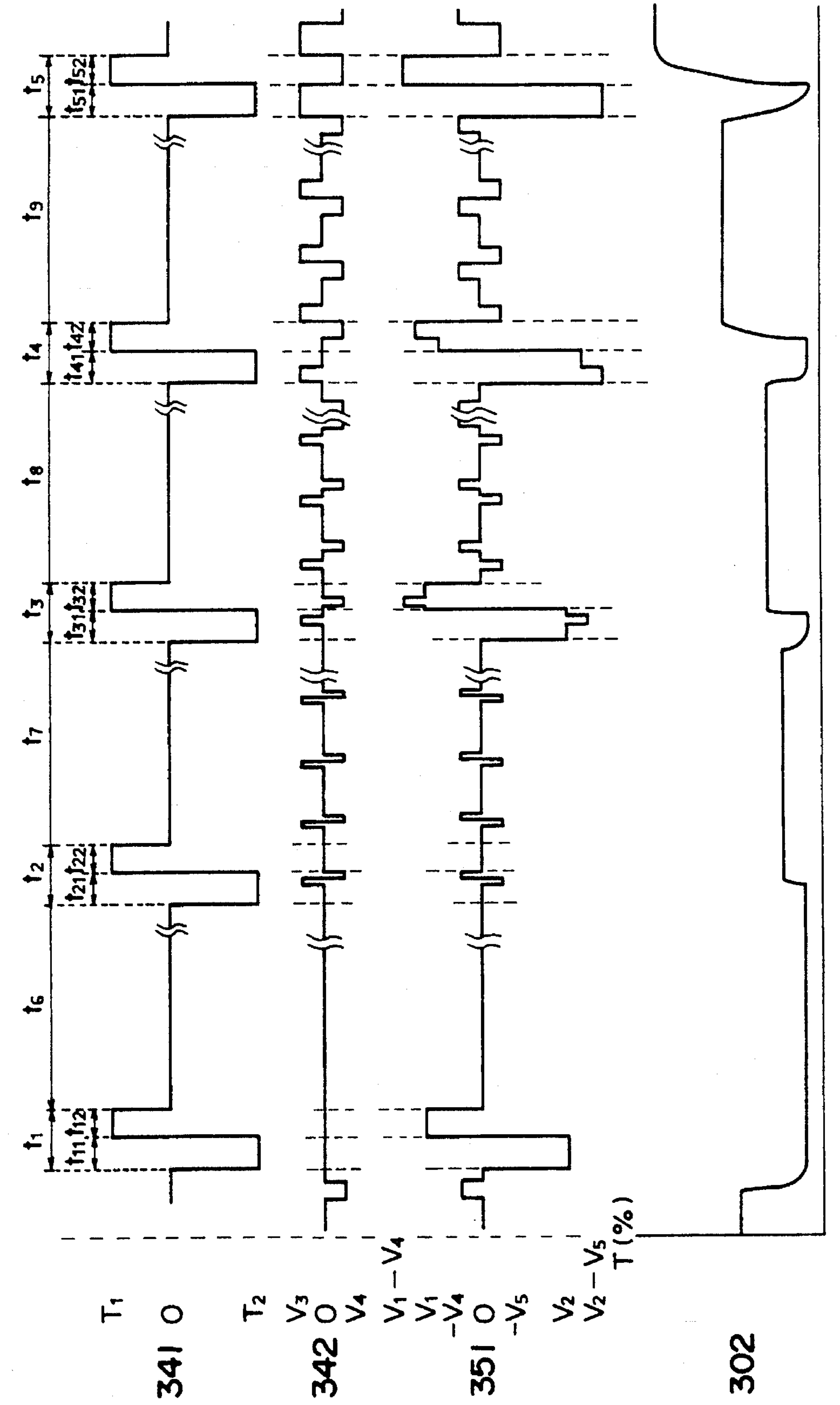
FIG. 2 PRIOR ART
Figure 4:
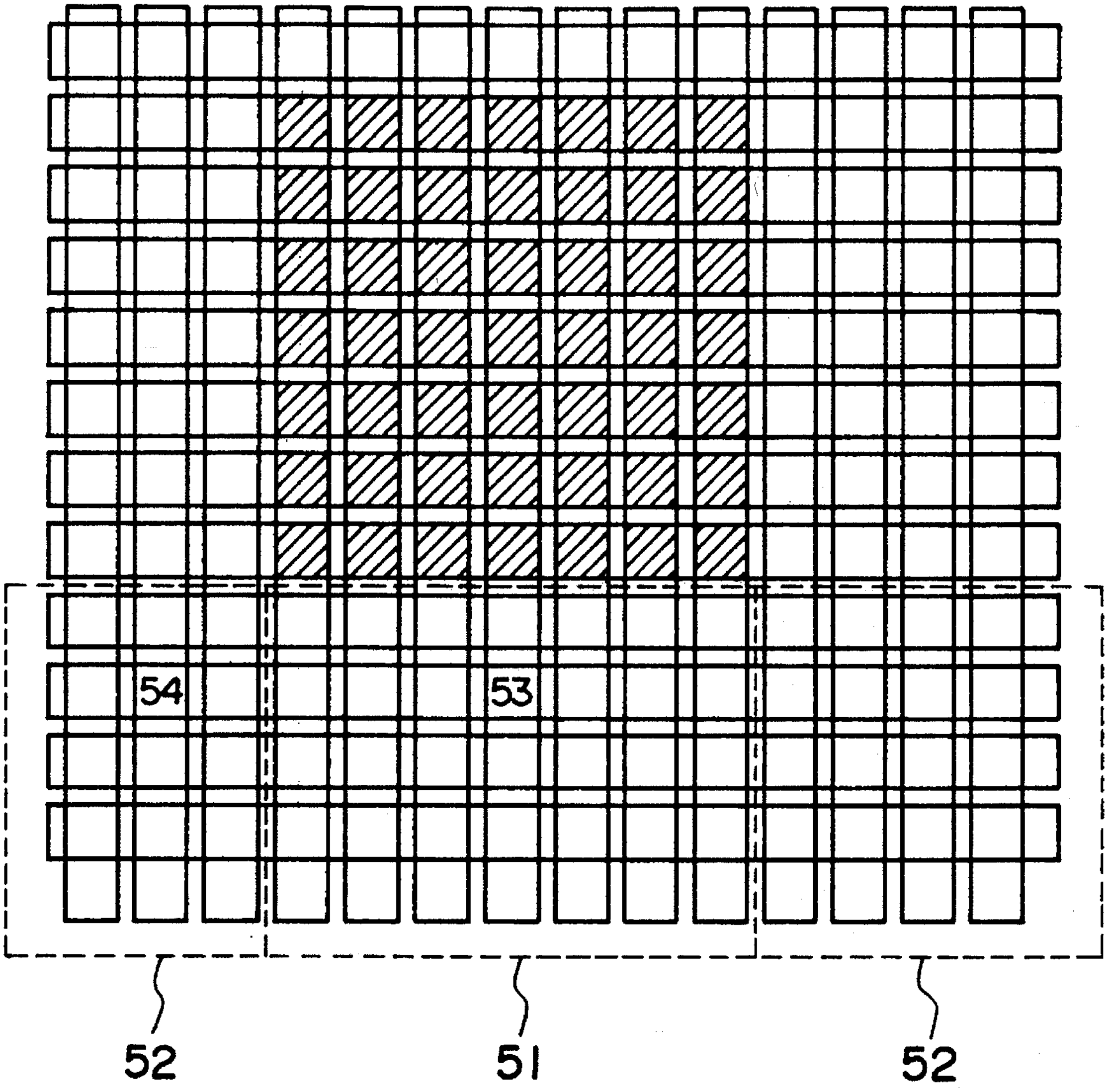
FIG. 4 is an illustration of a matrix display.
Figures 5A, 5B:
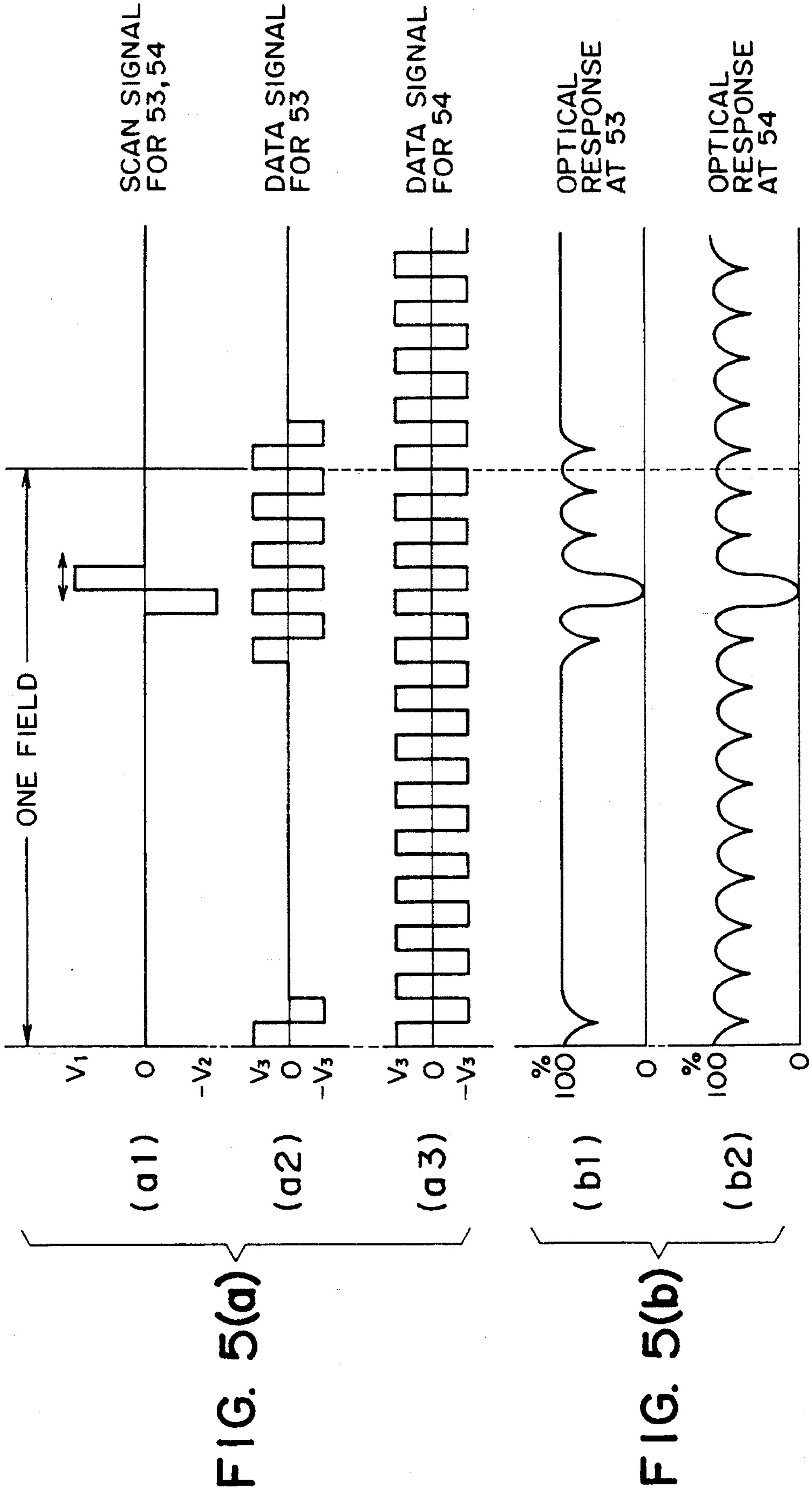
FIGS. 5(*a*) and (*b*) constitute is a diagram showing changes with time of a scanning signal, data signals, voltage signals applied to pixels and optical responses.
Figure 6:
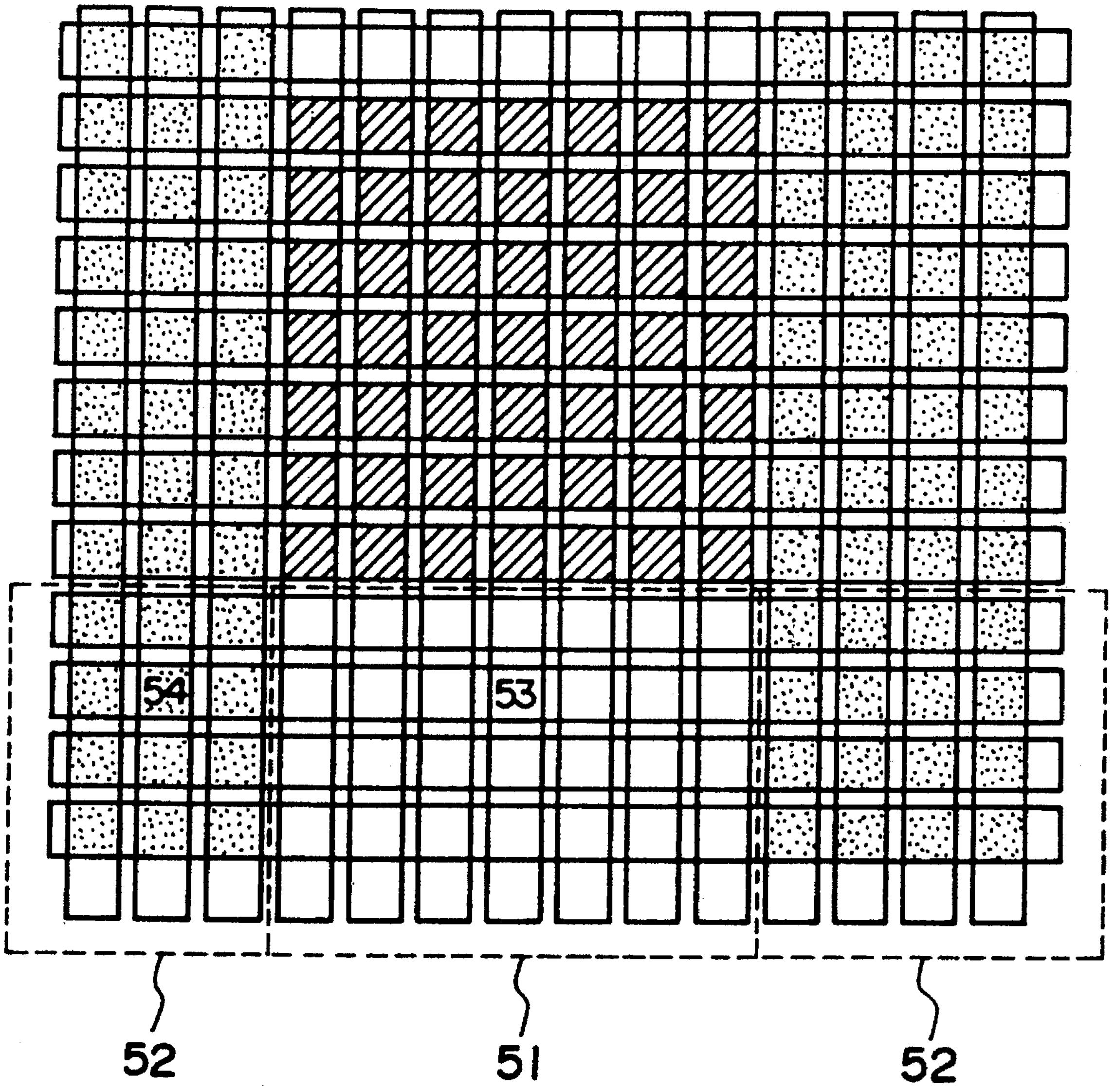
FIG. 6 is an illustration of a matrix display affected by crosstalk.
Figures 7A, 7B, 7C, 7D, 7E:
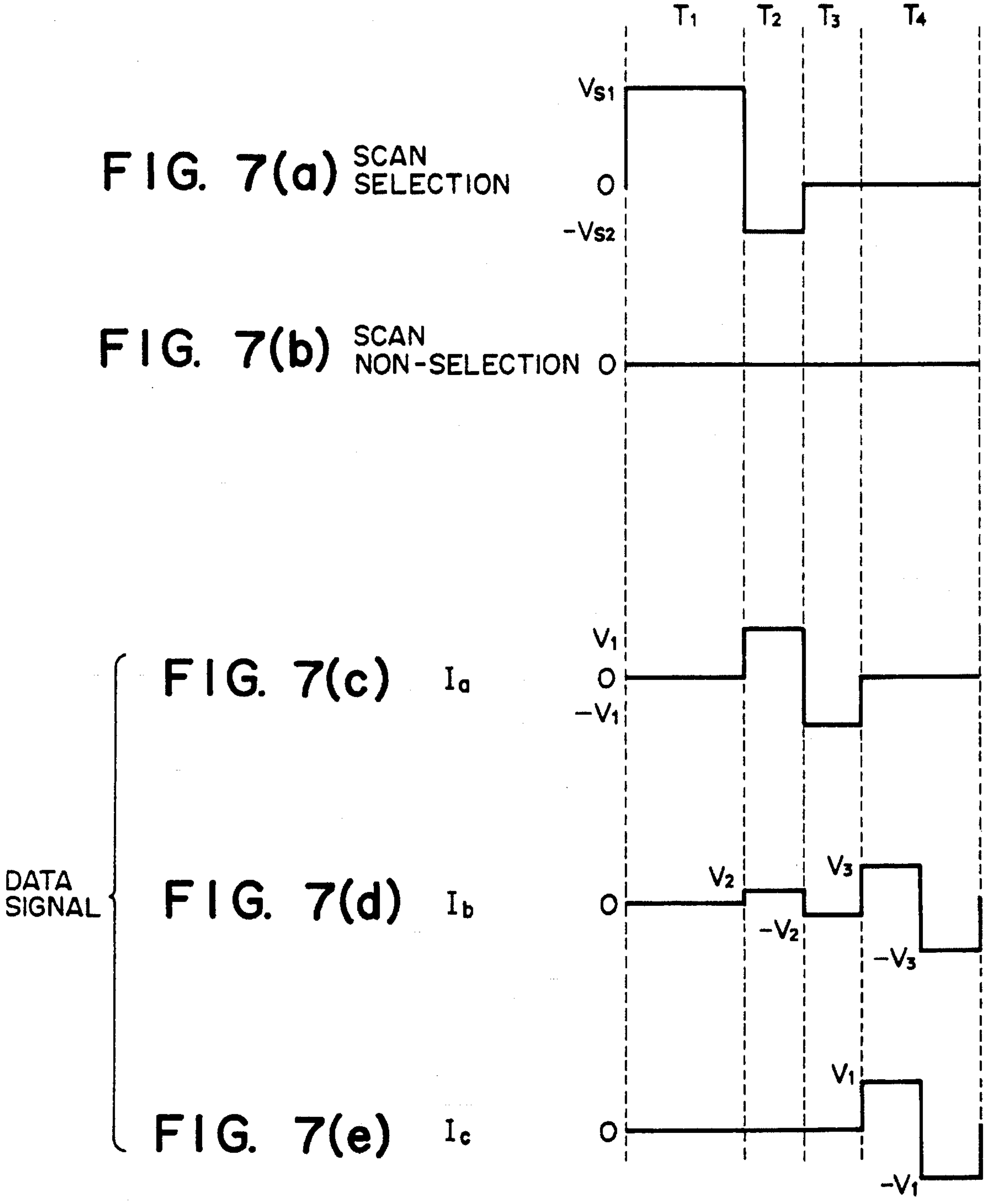
FIG. 7(*a*)–(*e*) constitute a waveform diagram showing a set of drive signals developed for alleviating the crosstalk.
Figures 9A, 9B, 9C, 9D, 9E, 9F:
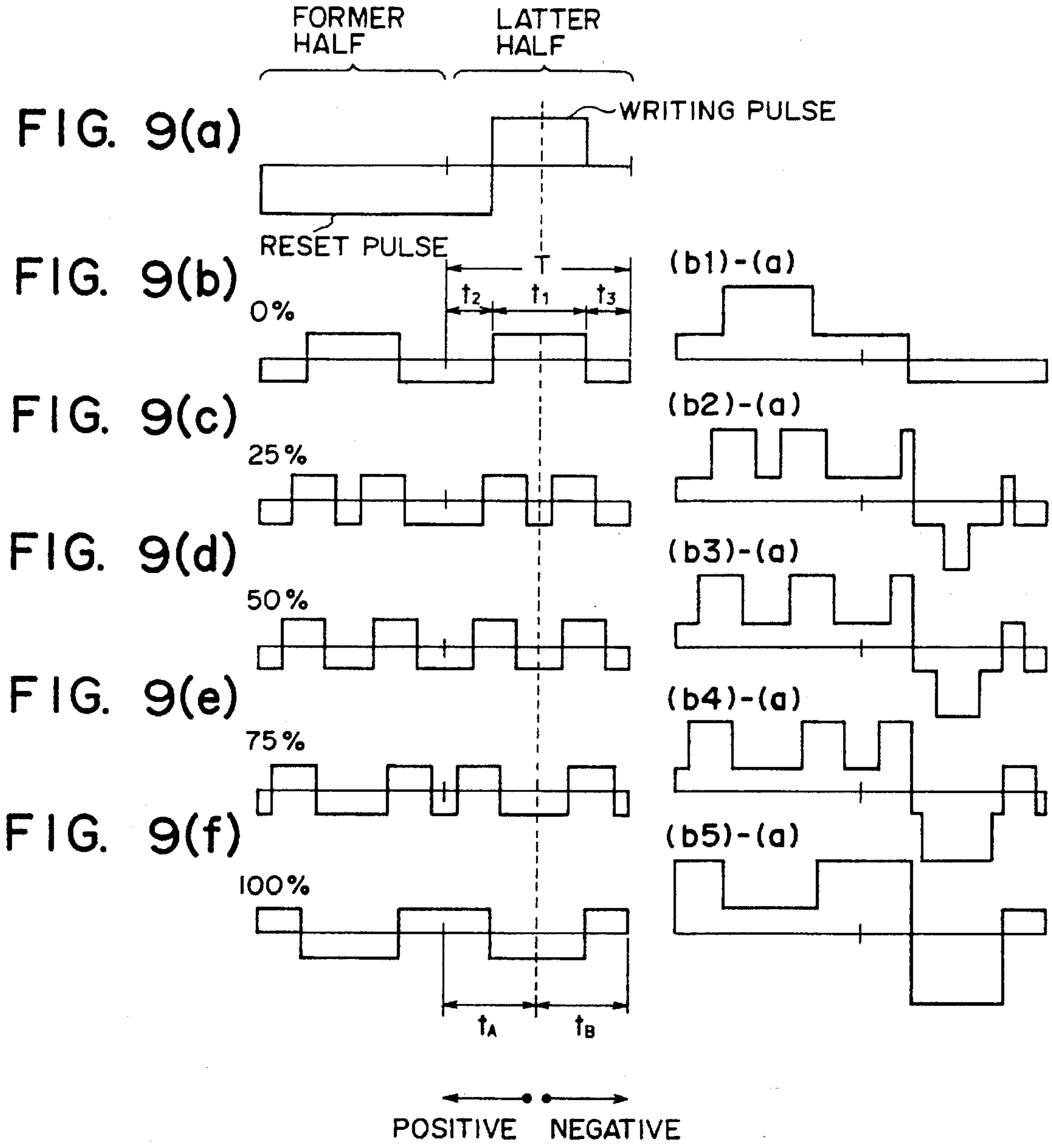
FIGS. 9(*a*)–(*f*) show a set of drive signals waveforms used in an embodiment of the invention.

FIG. 9(*a*)–(*f*) show a set of drive signals used in a first embodiment of the present invention including a scanning selection signal at (a) (but not showing a scanning non-selection signal of 0 volt), data signals at (b1) to (b5) corresponding to five gradation data of 0%, 25%, 50%, 75% and 100%, respectively, and combined voltage signals applied to pixels at (b1)-(a) to (b5)-(a), respectively.

The former half of the scanning selection signal is a pulse for resetting all pixels on a selected scanning line into a wholly dark (black) state and the latter half is a writing pulse for writing a grey to white (wholly bright) state in pixels on the scanning line selectively depending on given gradation data. Regarding data signals at (b1) to (b5) for 0, 25%, 50%, 75% and 100%, T denotes a period for a unit of data signals including a period $t_1$ for determining a gradation level and auxiliary signal periods $t_2$ and $t_3$ for cancelling the DC component in the period $t_1$. The total of $t_2$ and $t_3$ is set to be equal to $t_1$. In this embodiment, $t_2=t_3=t_{1/2}=15$ μsec. Thus, the unit of data signals requires a period T for obtaining a desired display state and provides an effective value of zero free from DC component during the period T.

Phase modulation in this embodiment will be described below. As shown in FIG. 9(*a*)–(*f*) one unit period of data signal is divided into two sections $t_A$ to $t_B$. Within the section $t_A$, the alternating voltage as a data signal waveform changes its phase by 180 degrees corresponding to a change in gradation data from 0% to 100%. Within the section $t_B$, the phase change is caused by 180 degrees in a reverse direction with respect to the section $t_A$.

The phase change or phase modulation performed in the present invention is to change or shift the time of switching rectangular voltages depending on gradation data within a period while maintaining the average voltage value at constant within the period. The direction of phase change is defined as positive when the switching time becomes earlier (toward the left in the figure) and as negative when the switching time becomes later (toward the right), respectively, in accordance with the change in gradation data of 0%→100%. In FIG. 9, the phase change in $t_A$ is in a positive direction and the phase change in $t_B$ is in a negative direction.

In the present invention, the phase change direction in each section is set to be identical or single, and the phase change directions in adjacent sections are set to be opposite to each other.

As is clear from FIG. 9(*a*)–(*f*), by the above arrangement, the period of continual application of a single polarity voltage to a non-selected pixel does not exceed $t_1$ at the maximum no matter what the previous or subsequent data signal is, so that no decrease in contrast is caused thereby. Further, as no additional auxiliary period is used, the unit period T only amounts to $2t_1$. Further, in the above-mentioned phase modulation of the invention, the integral value of data signal is respectively constant for the positive polarity and the negative polarity regardless of the gradation data, so that the above-mentioned crosstalk does not occur.

Figures 10A, 10B, 10C, 10D, 10E, 10F:
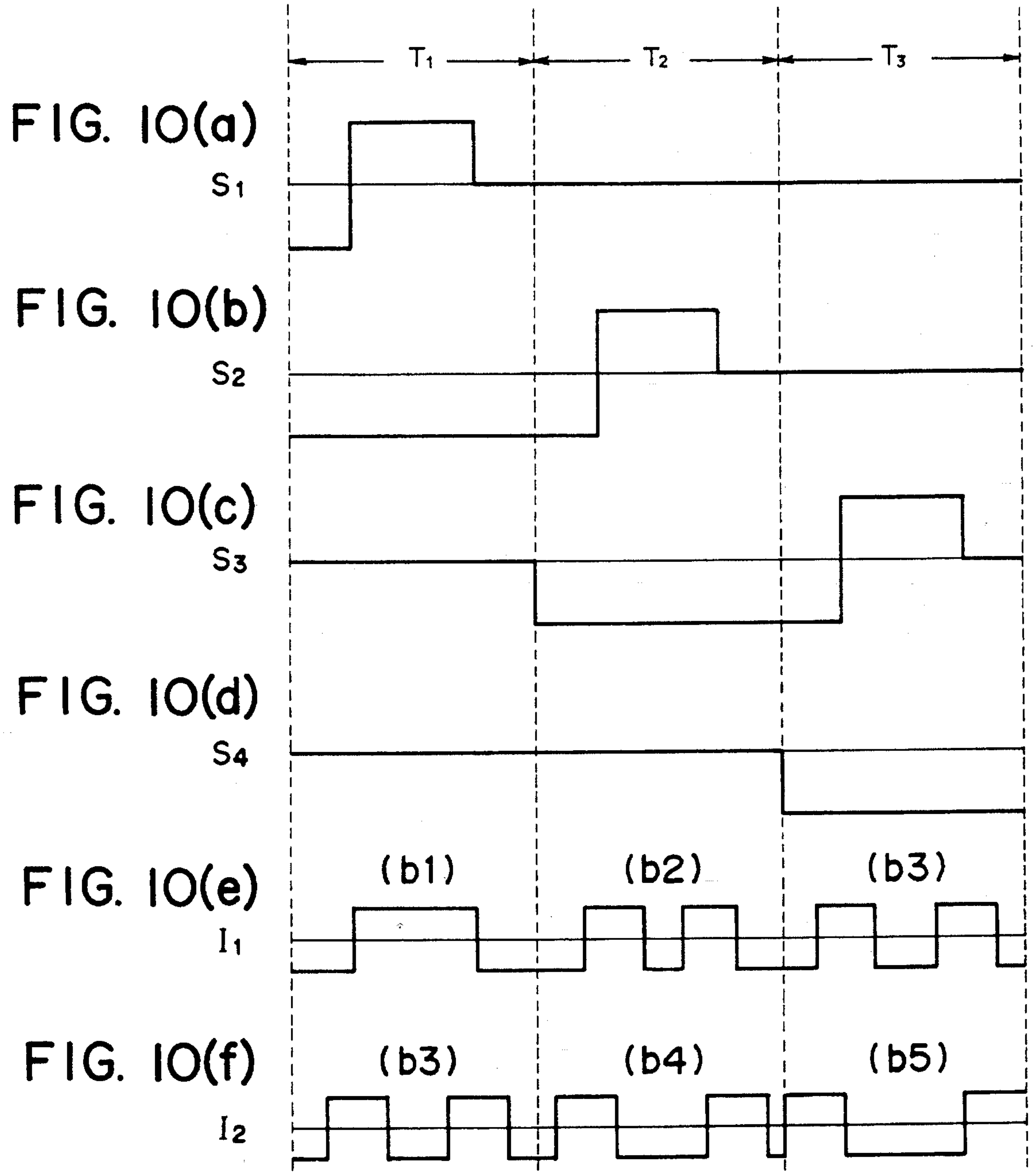
FIGS. 10(*a*)–(*f*) show time-serially applied waveforms according to the invention.

FIGS. 10(*a*–(*f*) constitute a time chart of a case wherein the signals shown in FIGS. 9(*a*)–(*f*) are applied time-serially. At $S_1$–$S_4$ are shown voltage signals applied to scanning lines $S_1$–$S_4$, and at $I_1$ and $I_2$ are shown voltage signals applied to data lines $I_1$ and $I_2$. At $T_1$, a scanning line $S_1$ is selected, and a pixel at an intersection with a data line $I_1$ is supplied with a gradation voltage for 0% ((b1)-(a) in FIGS. 9(*a*)–(*f*) and a pixel at an intersection with $I_2$ is supplied with a gradation voltage for 50% ((b3)-(a)) to provide desired display states. Simultaneously therewith, a scanning line $S_2$ is supplied with a reset pulse, so that all the pixels on the scanning line $S_2$ are reset into a black state. Thereafter, similar operations are continued at $T_2$, $T_3$, . . .

(Second Embodiment)

Figures 11A, 11B, 11C, 11D, 11E, 11F:
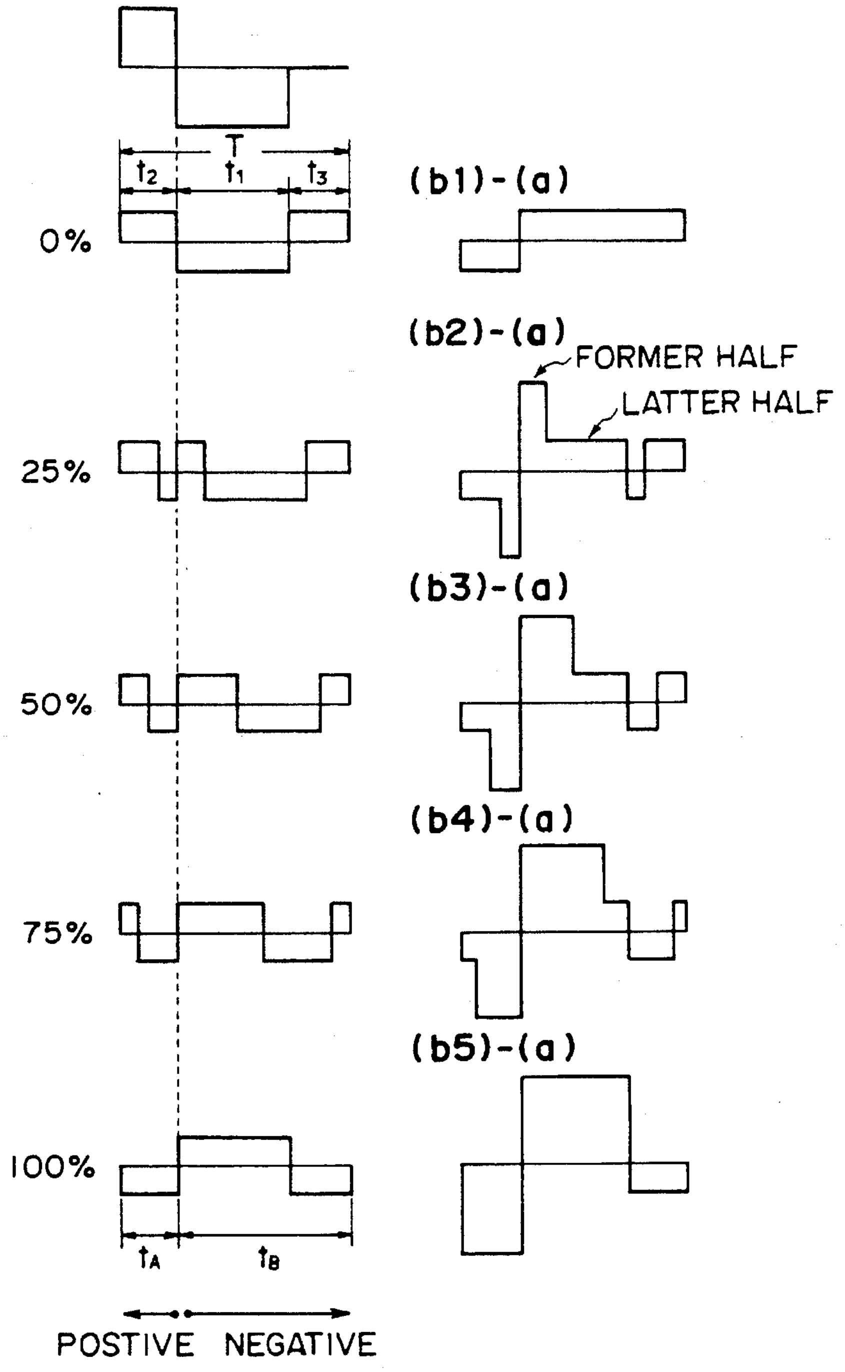
FIGS. 11(*a*)–13(*f*) respectively show another set of drive signals adopted in second, third and fourth embodiments, respectively, of the invention.

FIGS. 11(*a*)–(*f*) show a set of drive signals used in another embodiment of the present invention including a scanning selection signal at (a), data signals at (b1) to (b5) corresponding to gradation data of 0%, 25%, 50%, 75% and 100%, respectively, and combined voltage signals applied to pixels at (b1)-(a) to (b5)-(a). In this embodiment, different from the first embodiment, the pixels are reset into a white state and written in an grey to black state, so that the respective signals are opposite in polarity. Further, for brevity of illustration, only one unit of display signal is shown as different from FIGS. 9(*a*)–(*f*) showing two units. This embodiment is different from the first embodiment in that one unit period of data signals is divided into unequal sections as shown in FIG. 11(*a*)–(*f*). A 180 degrees phase change is caused in a positive direction in section $t_A$ and a 180 degrees phase change in a negative direction is caused in section $t_B$. In this embodiment, because of reverse phase change directions in adjacent sections which may be different in length, the voltage signals applied to pixels in the gradation-determining period $t_1$ are generally caused to have a large value in a former half and a small value in a latter half, thus showing generally a shape of letter "L" as shown at (b2)-(a) to (b4)-(a), whereby gradation display can be easily performed stably and at a high reproducibility.

(Third Embodiment)

Figure 12A:
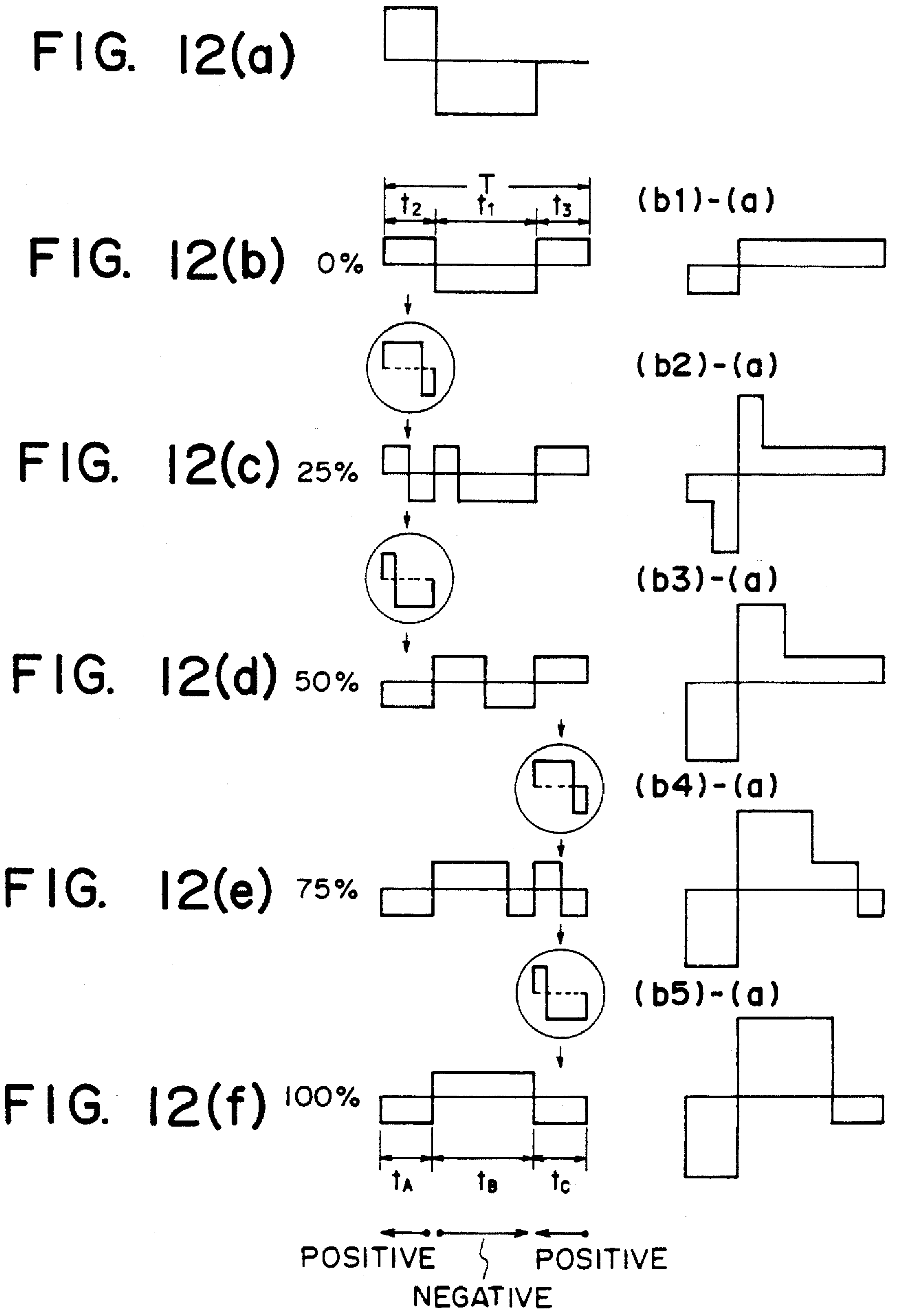
Figure 13A:
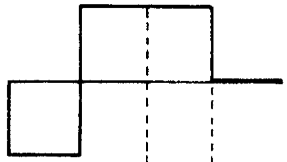
Figure 13A:
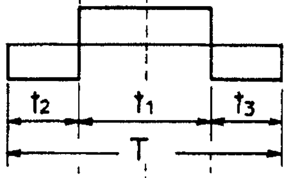
Figure 13A:
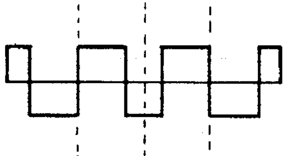
Figure 13A:
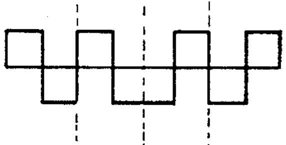
Figure 13A:
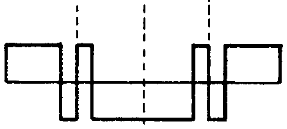
Figure 13A:
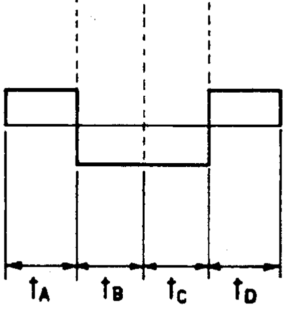
Figure 13A:
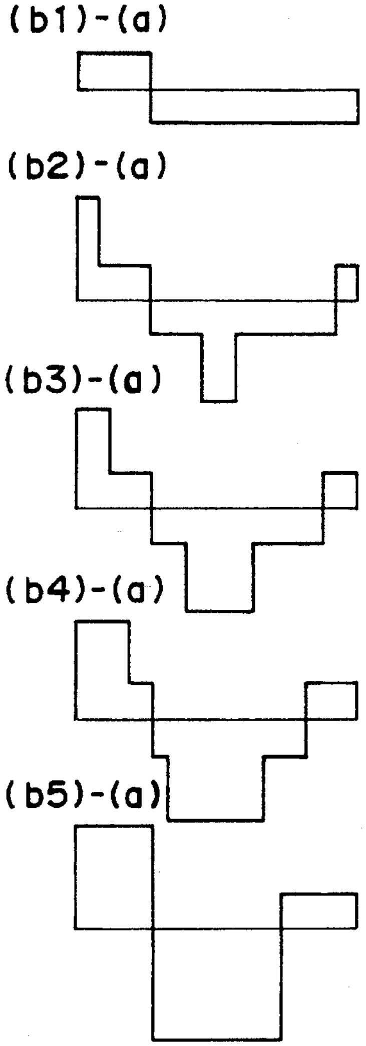

FIG. 12(*a*)–(*f*) shows a set of drive signals used in a third embodiment of the present invention, wherein one unit period T of data signal is divided into three sections.

As shown in FIG. 12(*a*)–(*f*), a unit period T of data signal is divided into three sections $t_A$, $t_B$ and $t_C$. In each pair of adjacent sections, the phase change directions are opposite to each other. In section $t_A$, the phase change is caused in a positive direction in the gradation range of 0%–50% and not caused in the gradation range of 50%–100%. In section $t_B$, the phase change is caused in a negative direction over the gradation range of 0%–100%. In section $t_C$, the data signal is not changed in the gradation range of 0%–50% but is caused to have a phase change in a positive direction in the gradation range of 50% –100%.

According to this embodiment, the L-shaped waveform in the gradation-determining period is caused to have an elongated base portion ((b1)-(a) to (b3)-(a)) so that the gradation display is less affected by rounding of phase waveforms caused by signal delay.

(Fourth Embodiment)

FIG. 13(*a*)–(*f*) show a set of drive signal waveforms used in a fourth embodiment of the present invention, wherein one unit period T of data signal is divided into four sections $t_A$–$t_D$. In first, and third sections $t_A$ and $t_C$, the phase-change is caused in a positive direction and, in second and fourth sections $t_B$ and $t_D$, the phase change is caused in a negative direction. In this embodiment, the voltage signals applied to pixels in the gradation-determining period are caused to have a longer base portion than in the first embodiment, so that the gradation display is less affected by rounding of pulse waveforms caused by signal delay similarly as in the third embodiment.

In the above embodiments, data signals are constituted by only bipolar two-level signals instead of multi-level signals. This is advantageous in simplifying the drive circuit designing and software designing.

Figure 14:
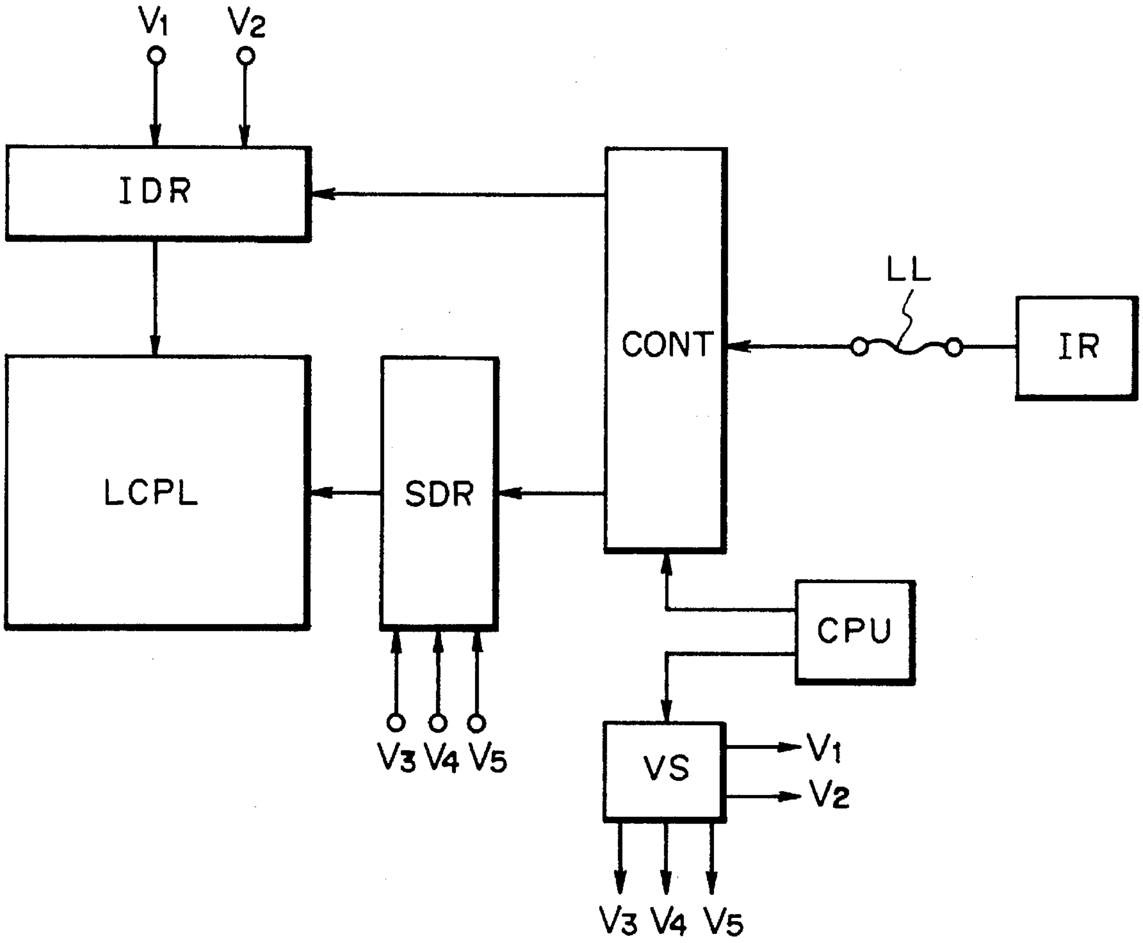
FIG. 14 is a block diagram of an embodiment of the liquid crystal apparatus according to the invention.

FIG. 14 is a block diagram of a liquid crystal apparatus according to the present invention including a liquid crystal device and a drive system therefor. Referring to FIG. 14, image data outputted from an image reader (IR) as a data input means is sent via a transmission line (LL) and inputted to a controller (CONT) by which a scanning line driven (SDR) and a data line driver (IDR) are controlled based on the input signals. The data line driver (IDR) outputs data signals for gradational display as shown in FIGS. 9–13 by varying the period of opening the gate inside the driver IDR based on reference voltages $V_1$ and $V_2$.

On the other hand, the scanning line driver (SDR) generates scanning signals as shown in FIGS. 9–13 and supplies the signals sequentially to the scanning lines based on reference voltages $V_3$, $V_4$ and $V_5$. The voltages $V_1$–$V_5$ are generated from a voltage supply VS under the control by a central processing unit (CPU) which also control the other means.

Figures 15A, 15B, 15C:
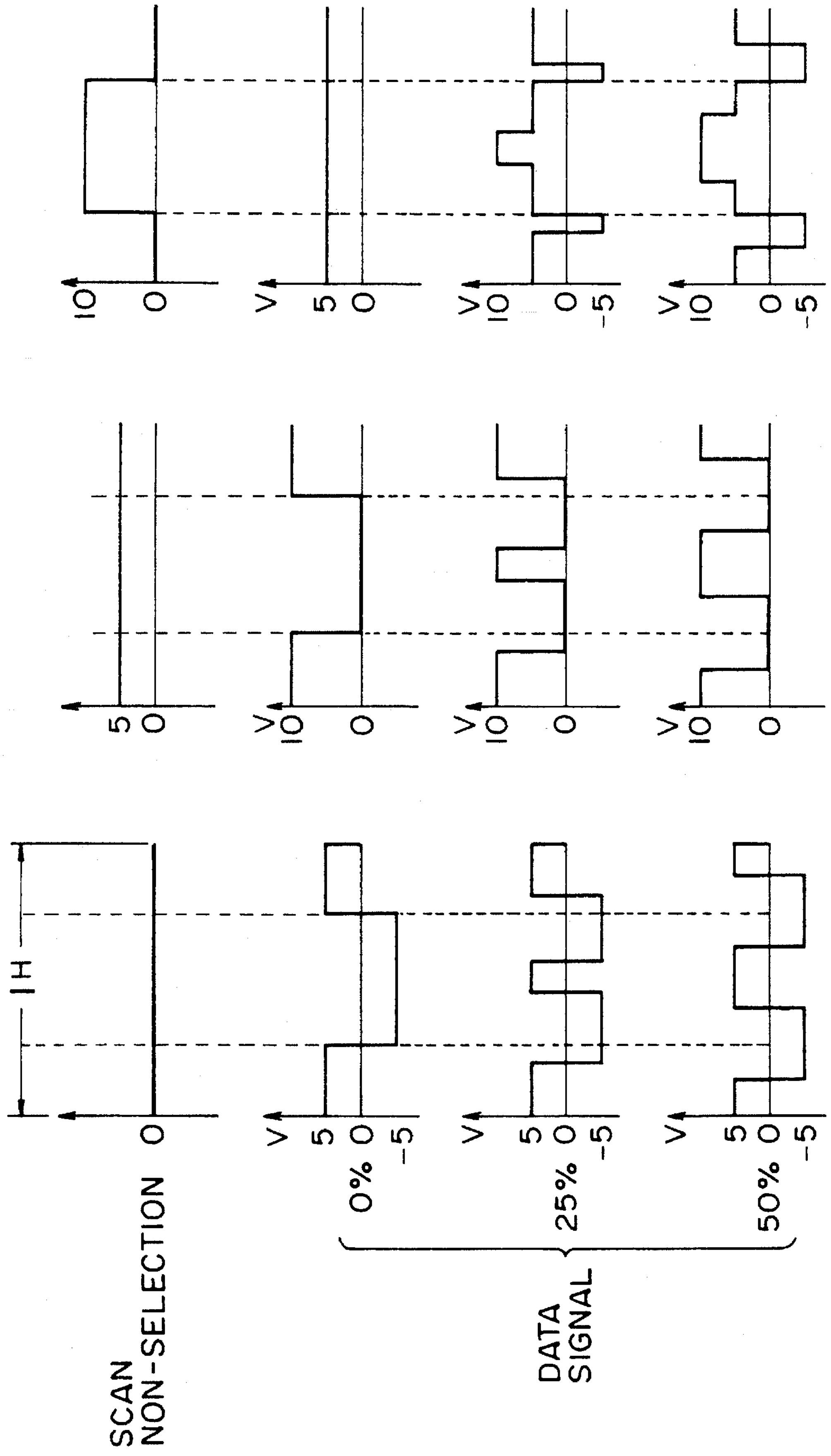
FIGS. 15(*a*)–(*c*) show modifications of drive signals used in the invention.

FIGS. 15(*a*)–(*c*) shows some examples of modification of drive signals used in the present invention. At FIG. 15(*a*) is shown a case wherein a non-selected scanning line is supplied with no bias voltage (0 volt) similarly as in the above embodiments, at FIG. 15(*b*) is shown a case wherein a non-selected scanning line is always supplied with a fixed bias voltage of 5 volts, and at FIG. 15(*c*) is shown a case where a non-selected scanning line is supplied with a fixed voltage of 10 volts for a part of the non-selection period. In each of cases 15(*a*)–(*c*), a scanning non-selection signal and data signals for gradation levels of 0%, 25% and 50% are shown.

As shown at FIGS. 15(*b*) and (*c*), when a scanning line at the time of non-selection is supplied with a non-zero voltage, it is desirable to also bias the data signals by the non-zero voltage. As shown at FIG. 15(*c*), when such a non-zero voltage is applied only at a partial period, the data signals are also shifted for only the partial period. The constant bias as shown at FIG. 15(*b*) is however desirable for using two-level reference voltages.

The above modification has been described with reference to the non-selecting period, but the same modification can be applied also to a scanning section signal and corresponding data signals.

As described above, according to the present invention, it has become possible to drive a liquid crystal device for gradational display while preventing crosstalk or contrast irregularity without lowering the scanning speed.

What is claimed is:

1. A driving method for a liquid crystal device of the type including a plurality of scanning electrodes, a plurality of data electrodes disposed to intersect the scanning electrodes so as to form an electrode matrix, and a liquid crystal disposed to form a pixel at each intersection of the scanning electrodes and data electrodes, said driving method comprising:

a first step of applying a scanning selection signal sequentially to the scanning electrodes; and a second step of applying to the data electrodes data signals phase-modulated depending on given gradation data;

wherein each data signal corresponding to halftone data applied in a selection period for a scanning electrode includes a first pulse, having a pulse width which varies depending on the halftone data, and a second pulse and a third pulse, each of a polarity opposite to that of the first pulse, disposed before and after, respectively, the first pulse; and the second and third pulses each have a pulse width which is shorter than a half of the selection period.

2. A method according to claim 1, wherein the selection period is divided into first and second periods which are equal in length to each other, and the first pulse is applied so as to span the first and second periods.

3. A method according to claim 1, wherein the selection period is divided into a first period and a second period longer than the first period, and application of the first pulse starts simultaneously with commencement of the second period.

4. A method according to claim 1, wherein the selection period is divided into a first period, a second period longer than the first period, and a third period shorter than the second period, and application of the first pulse starts simultaneously with commencement of the second period.

5. A method according to claim 1, wherein the selection period is divided into four periods of first to fourth periods which are equal in length to each other, and the first pulse is applied so as to span the second and third periods.

6. A liquid crystal apparatus including:

a liquid crystal device comprising a plurality of scanning electrodes, a plurality of data electrodes disposed to intersect the scanning electrodes so as to form an electrode matrix, and a liquid crystal disposed to form a pixel at each intersection of the scanning electrodes and data electrodes; and drive means for:

applying a scanning selection signal sequentially to the scanning electrodes; and applying to the data electrodes data signals phase-modulated depending on given gradation data;

wherein each data signal corresponding to halftone data applied in a selection period for a scanning electrode includes a first pulse having a pulse width which varies depending on the halftone data, and a second pulse and a third pulse, each of a polarity opposite to that of the first pulse, disposed before and after, respectively, the first pulse; and the second and third pulses each have a pulse width which is shorter than a half of the selection period.

7. An apparatus according to claim 6, wherein the selection period is divided into first and second periods which are equal in length to each other, and the first pulse is applied so as to span the first and second periods.

8. An apparatus according to claim 6, wherein the selection period is divided into a first period and a second period longer than the first period, and application of the first pulse starts simultaneously with commencement of the second period.

9. An apparatus according to claim 6, wherein the selection period is divided into a first period, a second period longer than the first period and a third period shorter than the second period, and application of the first pulse starts simultaneously with commencement of the second period.

10. An apparatus according to claim 6, wherein the scanning selection period is divided into four periods of first to fourth periods which are equal in length to each other, and the first pulse is applied so as to span the second and third periods.

11. An apparatus according to any one of claims 6–10, wherein said liquid crystal is a ferroelectric liquid crystal.

12. An apparatus according to any one of claim 6–10, further including a controller connected to said drive means.

* * * * *

UNITED STATES PATENT AND TRADEMARK OFFICE
CERTIFICATE OF CORRECTION

PATENT NO. : 5,521,727

DATED : May 28, 1996

INVENTORS YUTAKA INABA ET AL.

It is certified that error appears in the above-identified patent and that said Letters Patent is hereby corrected as shown below:

ON THE TITLE PAGE

[56] References Cited

FOREIGN PATENT DOCUMENTS "-62-102330 5/1987 Japan" should read --62-102230 5/1987 Japan--.

COLUMN 4

Line 56, "FIG. 9(a)-(f)" should read --FIGS. 9(a)-(f)--.

COLUMN 5

Line 11, "FIG. 9(a)-(f)" should read --FIGS. 9(a)-(f),--;
Line 34, "FIG. 9(a)-(f)," should read --FIGS. 9(a)-(f),--.

COLUMN 6

Line 5, "FIG. 11(a)-(f)." should read --FIGS. 11(a)-(f).--;

UNITED STATES PATENT AND TRADEMARK OFFICE
CERTIFICATE OF CORRECTION

PATENT NO. : 5,521,727

DATED : May 28, 1996

INVENTORS YUTAKA INABA ET AL.

It is certified that error appears in the above-identified patent and that said Letters Patent is hereby corrected as shown below:

COLUMN 6 continued

Line 17, "FIG. 12(a)-(f) shows" should read --FIGS. 12(a)-(f) show--;
Line 20, "FIG. 12(a)-(f)," should read --FIGS. 12(a)-(f),--;
Line 37, "FIG. 13(a)-(f)" should read --FIGS. 13(a)-(f)--.

COLUMN 7

Line 4, "shows" should read --show--.

COLUMN 8

Line 55, "claim 6-10," should read --claims 6-10,--.

Signed and Sealed this

Twenty-fourth Day of September, 1996

Attest:

BRUCE LEHMAN

Attesting Officer

Commissioner of Patents and Trademarks